United States Patent [19]

Yoshimoto et al.

[11] Patent Number: 4,863,825

[45] Date of Patent: Sep. 5, 1989

[54] LOW TEMPERATURE FIXABLE ELECTROPHOTOGRAPHIC TONER COMPOSITION COMPRISING NONLINEAR POLYESTER RESIN

[75] Inventors: Nobuyuki Yoshimoto; Hirobumi Iemura, both of Kawagoe; Osamu Oseto, Suita; Nobuo Yamada, Nara, all of Japan

[73] Assignees: Toyo Ink Manufacturing Co., Ltd., Tokyo; Arakawa Kagaku Kogyo Kabushiki Kaisha, Osaka, both of Japan

[21] Appl. No.: 117,879

[22] Filed: Nov. 9, 1987

[30] Foreign Application Priority Data

Nov. 10, 1986 [JP] Japan ............................. 61-267159

[51] Int. Cl.$^4$ ..................... G03G 9/08; G03G 11/00
[52] U.S. Cl. .................................. 430/109; 430/904; 430/99; 430/124
[58] Field of Search ......................... 430/109, 904, 99

[56] References Cited

U.S. PATENT DOCUMENTS

| | | | |
|---|---|---|---|
| 2,297,691 | 10/1942 | Carlson ........................... | 430/120 X |
| 3,507,686 | 4/1970 | Hagenbach ...................... | 430/108 |
| 4,507,376 | 3/1985 | Makita et al. .................... | 430/109 |
| 4,557,991 | 12/1985 | Takagiwa et al. ................ | 430/109 |
| 4,657,837 | 4/1987 | Morita et al. .................... | 430/109 |

FOREIGN PATENT DOCUMENTS 59-9669 1/1984 Japan.
61-5933 12/1986 Japan.

*Primary Examiner*—J. David Welsh
*Attorney, Agent, or Firm*—Armstrong, Nikaido, Marmelstein, Kubovcik & Murray

[57] ABSTRACT

A toner composition for electrophotography excellent in fixing property at a low temperature, offset resistance and blocking resistance comprising a resin binder and a colorant which is dispersed in the resin binder, the resin binder being a nonlinear polyester resin prepared by the reaction of:

(a) an acid component comprising at least one long chain dicarboxylic acid selected from the group consisting of a linear aliphatic dicarboxylic acid having 16 to 34 carbon atoms, a dimer acid and a dibasic acid having 21 carbon atoms, an aromatic dicarboxylic acid, and optionally a monocarboxylic acid, (b) an alcohol component comprising an etherificated diphenol and optionally a glycidyl ester of rosin and (c) a crosslinking component comprising a polycarboxylic acid having valency of not less than 3 and/or a polyhydric alcohol having a valency of not less than 3, wherein in case that the long chain dicarboxylic acid and the aliphatic dicarboxylic acid are employed, the contents of the long chain dicarboxylic acid and the aromatic dicarboxylic acid are 2 to 25% by mole and 75 to 98% by mole, respectively and in case that the long chain dicarboxylic acid, the aliphatic dicarboxylic acid and the monocarboxylic acid are employed, the contents of the long chain dicarboxylic acid, the aliphatic dicarboxylic acid and the monocarboxylic acid are 2 to 25% by mole, 10 to 93% by mole and 5 to 65% by mole, respectively, based upon the total amount of the (a) acid component, the content of the (c) crosslinking component is 0.5 to 20% by weight of the polyester resin, and an organic polyvalent metal compound is contained in an amount of 0 to 40% by weight based upon the polyester resin.

3 Claims, No Drawings

LOW TEMPERATURE ELECTROPHOTOGRAPHIC TONER COMPOSITION COMPRISING NONLINEAR POLYESTER RESIN

BACKGROUND OF THE INVENTION

The present invention relates to a toner composition for electrophotography, and more particularly to an electrophotographic toner composition having excellent fixing property at a low temperature, offset resistance, blocking resistance and the like which contains a specific polyester resin as a binder.

Various electrophotographic methods are hitherto known. There is generally known a method in which a latent electrostatic image is formed on a photosensitive layer utilizing a photoconductive material by various means and is then developed with a toner, and after transferring the toner image to a support such as paper if necessary, the toner image is fixed by heating, applying a pressure or using a solvent.

In recent years, a high speed fixing property is required for the toner in order to increase the efficiency of the copying operation. Attempts such as using a thermoplastic resin having a lower softening point and being easily heat fusible as a toner binder to be used in a conventional oven-heat fixing method have been investigated to provide a toner composition satisfying the requirements. However, mere lowering of the softening point of a resin binder has the defect of causing agglomeration of toner particles, namely blocking phenomenon, during storage or use. Accordingly, as one system for high speed fixing, there has been utilized a fixing method using a heat roller having a good heat conductivity.

Since the heat roller system is higher in heat efficiency than the oven-heat fixing system, a toner can be fixed in a shortened period of time. However, sticking of the toner to the heat roller, namely the so-called offset phenemenon, occurs, since the toner is directly brought into contact with the heat roller. Accordingly, it has been desired to develop a resin capable of solving this problem. A styrene-acrylate copolymer and a styrenebutadiene copolymer are usually known as a resin binder for a toner. These vinyl copolymers are in general poor in offset resistance and fixing property at a low temperature.

One of other resin binders is a bisphenol type epoxy resin. The bisphenol type epoxy resin provides a toner having superior fixing property at a low temperature because of having a lower molecular weight as compared with the vinyl copolymer binder. But, it has a tendency to lower the offset resistance, because the melt viscosity of the resin is low.

Recently, various polyester resins are proposed as a resin binder used in a toner which is excellent in both offset resistance and fixing property at a low temperature. A polyester resin produced by employing an etherificated diphenol as a main component of alcohol has been investigated from the viewpoint of the blocking resistance, offset resistance, and the like.

However, according to the inventors' researches, the polyester resin is excellent in blocking resistance, but does not have sufficient offset resistance and fixing property, in particular, fixing property at a low temperature.

Accordingly, the present inventors have been examined to develop a polyester resin which is excellent in blocking resistance and offset resistance and has well balanced properties with fixing property at a low temperature.

It is an object of the present invention to provide a novel electrophotographic toner composition which can solve the problem that conventional techniques can not solve, that is, an electrophotographic toner composition which satisfies at a time well-balanced offset resistance, blocking resistance and fixing property at a low temperature which are required for an electrophotographic toner composition containing a polyester resin as a binder and, in particular, which is suitably used in high speed machines has not yet been obtained.

In general, it is supposed that the improvement of fixing property at a low temperature of the electrophotographic toner composition will be accomplished by lowering the glass transition point or the molecular weight of the binder. Accordingly, the inventors have attempted to improve the fixing property at a low temperature by using a generally well-known aliphatic dicarboxylic acid having 4 to 10 carbon atoms as a plastic component to lower the glass transition point of an obtained resin binder. As the result, the fixing property at a low temperature of a toner composition for electrophotography in which the above resin is employed as a binder is improved to a certain degree. However, the improvement of the fixing property at a low temperature has not yet been sufficiently satisfied and also, there is a tendency that offset resistance and blocking resistance are lowered.

Thereupon, the present inventors have investigated to improve various properties, in particular, fixing property at a low temperature of a toner composition containing a polyester resin for electrophotography aiming at a plastic component. As the results, they have eventually found the marvelous facts that in case of employing a specific polyester resin obtained by employing at least one long chain aliphatic dicarboxylic acid selected from the group consisting of a linear aliphatic dicarboxylic acid having 16 to 34 carbon atoms, a dimer acid and a dibasic acid having 21 carbon atoms instead of the above-mentioned aliphatic dicarboxylic acid in the same amount of the aliphatic dicarboxylic acid, it is observed few differences between the glass transition point of the obtained toner composition and that of the above-mentioned composition in which an aliphatic dicarboxylic acid having 4 to 10 carbon atoms is employed, that the fixing property of the obtained toner composition is remarkably improved and further, that offset resistance and blocking resistance of the obtained toner composition is very excellent. Further, they have found that in case of using a modified resin binder having a broader range of molecular weight with a rosin glycidyl ester and/or a monocarboxylic acid, a toner for electrophotography more excellent in fixing property at a low temperature can be provided. The present invention has been eventually accomplished on the basis of the above researches.

These and other objects of the present invention will become apparent from the description hereinafter.

SUMMARY OF THE INVENTION

In accordance with the present invention, there is provided a toner composition excellent in fixing property at a low temperature, offset resistance, blocking resistance, and the like.

That is, in accordance with the present invention, there are provided (I) a toner composition for electrophotography excellent in fixing property at a low temperature comprising a resin binder and a colorant which is dispersed in the resin binder, the resin binder being a nonlinear polyester resin prepared by the reaction of:

(a) an acid component comprising at least one long chain dicarboxylic acid selected from the group consisting of a linear aliphatic dicarboxylic acid having 16 to 34 carbon atoms, a dimer acid and a dibasic acid having 21 carbon atoms, and an aromatic dicarboxylic acid, (b) an alcohol component comprising an eterificated diphenol and (c) a crosslinking component comprising a polycarboxylic acid having a valency of not less than 3 and/or a polyhydric alcohol having a valency of not less than 3, wherein the contents of the long chain dicarboxylic acid and the aromatic dicarboylc acid are 2 to 25% by mole and 75 to 98% by mole, respectively, based upon the total amount of the (a) acid component, the content of the (c) crosslinking component is 0.5 to 20% by weight of the polyester resin, and an organic polyvalent metal compound is contained in an amount of 0 to 4% by weight based upon the polyester resin, (II) a toner composition for electrophotography excellent in fixing property at a low temperature comprising a resin binder and a colorant which is dispersed in the resin binder, the resin binder being a nonlinear polyester resin prepared by the reaction of:

(a) an acid component comprising at least one long chain dicarboxylic acid selected from the group consisting of a linear aliphatic dicarboxylic acid having 16 to 34 carbon atoms, a dimer acid and a dibasic acid having 21 carbon atoms, and an aromatic dicarboxylic acid, (b) an alcohol component comprising an eterificated diphenol and a glycidyl ester of rosin and (c) a crosslinking component comprising a polycarboxylic acid having a valency of not less than 3 and/or a polyhydric alcohol having a valency of not less than 3, wherein the contents of the long chain dicarboxylic acid and the aromatic dicarboxylic acid are 2 to 25% by mole and 75 to 98% by mole, respectively, based upon the total amount of the (a) acid component, the contents of the eterificated diphenol and the glycidyl ester of rosin are 50 to 95% by mole and 5 to 50% by mole, respectively, based upon the total amount of the polyhydric alcohol, the content of the (c) crosslinking component is 0.5 to 20% by weight of the polyester resin, and an organic polyvalent metal compound is contained in an amount of 0 to 4% by weight based upon the polyester resin, (III) a toner composition for electrophotography excellent in fixing property at a low temperature comprising a resin binder and a colorant which is dispersed in the resin binder, the resin binder being a nonlinear polyester resin prepared by the reaction of:

(a) an acid component comprising at least one long chain dicarboxylic acid selected from the group consisting of a linear aliphatic dicarboxylic acid having 16 to 34 carbon atoms, a dimer acid and a dibasic acid having 21 carbon atoms, an aromatic dicarboxylic acid and a monocarboxylic acid, (b) an alcohol component comprising an etherificated diphenol and (c) a crosslinking component comprising a polycarboxylic acid having a valency of not less than 3 and/or a polyhydric alcohol having a valency of not less than 3, wherein the contents of the long chain dicarboxylic acid, the aromatic dicarboxylic acid and the monocarboxylic acid are 2 to 25% by mole, 10 to 93% by mole an 5 to 65% by mole, respectively, based upon the total amount of the (a) acid component, the content of the (c) crosslinking component is 0.5 to 20% by weight of the polyester resin, and an organic polyvalent metal compound is contained in an amount of 0 to 4% by weight based upon the polyester resin, and (IV) a toner composition for electrophotography excellent in fixing property at a low temperature comprising a resin binder and a colorant which is dispersed in the resin binder, the resin binder being a nonlinear polyester resin prepared by the reaction of:

(a) an acid component comprising at least one long chain dicarboxylic acid selected from the group consisting of a linear aliphatic dicarboxylic acid having 16 to 34 carbon atoms, a dimer acid and a dibasic acid having 21 carbon atoms, an aromatic dicarboxylic acid and a monocarboxylic acid, (b) an alcohol component comprising an eterificated diphenol and a glycidyl ester of rosin and (c) a crosslinking component comprising a polycarboxylic acid having a valency of not less than 3 and/or a polyhydric alcohol having a valency of not less than 3, wherein the contents of the long chain dicarboxylic acid, the aromatic dicarboylc acid and the monocarboxylic acid are 2 to 25% by mole, 10 to 93% by mole and 5 to 65% by mole, respectively, based upon the total amount of the (a) acid component, the contents of the eterificated diphenol and the glycidyl ester of rosin are 50 to 95% by mole and 5 to 50% by mole, respectively, based upon the total amount of the polyhydric alcohol, the content of the (c) crosslinking component is 0.5 to 20% by weight of the polyester resin, and an organic polyvalent metal compound is contained in an amount of 0 to 4% by weight based upon the polyester resin.

DETAILED DESCRIPTION

The present invention relates to a toner composition for electrophotography in which a specific polyester resin is employed as a resin binder. According to the invention, the toner composition for electrophotography is characterized in that at least one member selected from the group consisting of a linear aliphatic dicarboxylic acid having 16 to 34 carbon atoms, a dimer acid and a dibasic acid having 21 carbon atoms is employed as a plastic component. Further, the toner composition is characterized in that a glycidyl ester of rosin and/or monocarboxylic acid are employed as a component of the resin binder to give a modified resin binder having a broader range of molecular weight.

Examples of the linear aliphatic dicarboxylic acid having 16 to 34 carbon atoms which is employed as the (a) acid component in the present invention are, for instance, hexadecanedicarboxylic acid, heptadecanedicarboxylic acid, octadecanedicaroxylic acid, nonadecanedicarboxylic acid, eicosanedicarboxylic acid, heneicosanedicarboxylic acid, docosanedicarboxylic acid, tricosanedicarboxylic acid, tetracosanedicarboxylic acid, hexacosanedicarboxylic acid, triacontanedicarboxylic acid, tetratriacontanedicarboxylic acid, and the like. These dicarboxylic acids can be easily commercially available. The dimer acid comprises a polymerized dicarboxylic acid, as a main component, obtained by polymerizing unsaturated fatty acids. As a process for preparing the dimer acid, a process that an unsaturated fatty acid such as soybean oil fatty acid containing a large amount of linolic acid or a tall oil fatty acid is isomerizated and is subjected to Diels-Alder reaction in the presence of a small amount of water under pressure and heating is generally employed. The process of synthesizing a dimer acid by using a catalyst of Lewis acid, a catalyst of a clay stabilized with lithium, a catalyst of a peroxide, and the like can be also employed in the present invention. The dimer acid means a component containing a dimer as a main component or an admixture of a monomer, a dimer and a trimer, and the mixing ratio of the monomer, dimer and trimer can be suitably changed in accordance with the uses. The dibasic acid having 21 carbon atoms can be obtained by conjugating the linolic acid containing in a tall oil fatty acid and at the same time the conjugated product is subjected to Diels-Alder addition with acrylic acid and also, is easily commercially available as an article on the markets. It is suitable that each of the contents of the linear aliphatic dicarboxylic acid, dimer acid and dibasic acid having 21 carbon atoms is adjusted to be in a range of 2 to 25% by mole, preferably 3 to 20% by mole based upon the total amount of the (a) acid component. When the content is less than 2% by mole, fixing property at a low temperature is scarcely improved, and when the content is more than 25% by mole, there is a tendency that blocking resistance is lowered as well as fixing property at a low temperature is scarcely improved.

Examples of the aromatic dicarboxylic acid are, for instance, phthalic anhydride, orthophthalic acid, isophthalic acid, terephthalic acid, and the like. The used amount of the aromatic dicarboxylic acid is determined in consideration of the glass transition point of an obtained polyester resin.

Examples of the monocarboxylic acid are, for instance, palmitic acid, stearic acid, benzoic acid, chlorobenzoic acid, dichlorobenzoic acid, para-t-butyl benzoic acid, cyclohexanecarboxylic acid, toluic acid, rosins, and the like. Among them, benzoic acid, pare-t-butyl benzoic acid and rosins are preferably used from the viewpoint of the softening point of the obtained polyester resin, the cost, and the like. The term "rosins" means various compounds described later to be used as starting materials of the rosin glycidyl ester. The monocarboxylic acid is employed to improve the fixing property at a low temperature of an obained toner composition and is an important component in the polyester resin. The used amount of the monocarboxylic acid is 5 to 65% by mole, preferably 10 to 50% by mole based upon the carboxylic acid component. When the used amount of the monocarboxylic acid is less than 5% by mole, the fixing property at a low temperature is scarcely improved. On the other hand, when the used amount is more than 65% by mole, there is a tendency that the glass transition point and offset resistance of an obtained polyester resin are lowered.

In the present invention, the rosin glycidyl ester used as the (b) alcohol component is prepared by reacting a rosin with epihalohydrin in the presence of a basic compound such as organic amines under heating. Examples of the rosin are, for instance, natural rosins such as gum rosin, tall oil rosin and wood rosin, and modified rosins obtained by modifying the natural rosins such as hydrogenated rosin and disproportionated rosin. Abietic acid, dehydroabietic acid, dihydroabietic acid, pimaric acid and isopimaric acid which are effective components of the rosin, are also preferably employed. Tertiary amines and onium salts thereof are preferred as the above-mentioned organic amines. Typical examples of the tertiary amines are triethylamine, dimethylbenzylamine, methyldibenzylamine, tribenzylamine, dimethylaniline, dimethylcyclohexylamine, methyldicyclohexylamine, tripropylamine, tributylamine, N-phenylmorpholine, N-methylpiperidine and pyridine. Typical examples of the onium salts of tertiary amines are tetramethylammonium chloride, benzyltriethylammonium chloride, allyltriethylammonium bromide, tetrabutylammonium chloride, methyltrioctylammonium chloride, trimethylamine hydrochloride, triethylamine hydrochloride and pyridine hydrochloride.

The purpose that the rosin glycidyl ester is employed is that as mentioned above, the etherificated diphenol is employed as the main alcohol component, the softening point of the resin is maintained at a high temperature and a polyester resin having well-balanced blocking resistance and fixing property at a low temperature is obtained. Therefore, the used amount of the rosin glycidyl ester is generally from 5 to 50% by mole, preferably from 10 to 30% by mole based upon 100% by mole of the total amount of the alcohol component (b) (in which a polyhydric alcohol having a valency of not less than 3 used as a crosslinking component is not included).

In the present invention, polycarboxylic acids having a valency of not less than 3 or polyhydric alcohols having a valency of not less than 3 are used as the crosslinking component (c). Examples of the polycarboxylic acids are, for instance, trimellitic acid, pyromellitic acid, acid anhydrides thereof, and the like. Examples of the polyhydric alcohols are, for instance, glycerol, trimethylol ethane, trimethylol propane, pentaerythritol, sorbitol, diglycerol, and the like. The used amount of the crosslinking component (c) is usually from 0.5 to 20% by weight based upon the polyester resin since the crosslinking component (c) influences the offset resistance of the obtained polyester resin.

In the present invention, the etherificated diphenols which are employed as main polyhydric alcohol components are obtained by conducting the addition reaction of bisphenol A and an alkylene oxide such as ethylene oxide or propylene oxide. The alkylene oxide having an added average number of 2 to 16 moles per mole of bisphenol A can be suitably used. The used amount of the etherificated diphenols is usually not less than 50% by mole based upon the total amount of the polyhydric alcohol component (b) from the viewpoint that the diphenols influence the softening point of the obtained polyester resin. When the amount of the etherificated diphenols is less than 50% by mole, it is not preferable since there is a tendency that the softening point of the polyester resin is lowered.

The polyester resin used as a binder in the present invention is prepared, for instance, by a process in which the acid component, the alcohol component and the crosslinking component are charged at once in the amounts within the above-mentioned ranges, and reacted with heating in the presence or absence of a reactive catalyst such as an organotin compound, or a process in which the acid component and the alcohol are reacted in the amounts within the above-mentioned ranges with heating in the presence or absence of the above-mentioned catalyst, the crosslinking component is then added in the course of or after the completion of the above reaction, and the reaction is further continued with heating.

Although the resin binder can be obtained in a good yield regardless of the presence or absence of a solvent, a solvent can be employed to smoothly remove the produced water from the reaction system. Typical examples of the solvent are toluene and xylene. The reaction temperature and the reaction time are suitably determined in consideration of the yield of the product. The reaction temperature and the reaction time are usually selected from 100° to 300° C. and 1 to 20 hours. Also, in case that a solvent has been employed upon the reaction, the product can be obtained as a solid by distilling away the solvent under reduced pressure. In accordance with the above-mentioned reaction, the polyester resin of the present invention can be easily prepared. The end point of the reaction can be easily determined, for instance, by measuring the acid value of the prepared resin, the ratio of the insoluble component to the solvent, gel permeation chromatogram, the softening point, and the like.

Physical or chemical constants of the polyester resin are suitably determined in consideration of the properties required for the electrophotographic toner composition, that is, fixing property at a low temperature, offset resistance, blocking resistance, and the like. It is desirable that the polyester resin has a softening point of 110° to 180° C. When the softening point is more than 180° C., the fixing property at a low temperature is lowered. On the other hand, when the softening point is less than 110° C., the offset resistance is lowered. Also, it is desirable that the glass transition temperature is from 50° to 80° C. When the glass transition temperature is less than 50° C., the blocking resistance is lowered. On the other hand, when the temperature is more than 80° C., the fixing property at a low temperature is lowered. As the polyester resin, a resin of which about 80% by weight is an insoluble component in tetrahydrofuran can be used as well as a resin which can be completely dissolved in tetrahydrofuran. Also, it is preferable that an acid value and a hydroxyl value of the resin are in the following ranges since the acid value and the hydroxyl value influence the electric properties when the obtained toner is used under the condition of high humidity. That is, the acid value is not more than 40, more preferably not more than 20. When employing an organic polyvalent metal compound mentioned later, it is preferable that the acid value of the polyester resin is from 5 to 40. The hydroxyl value of the polyester resin is not more than 30, preferably not more than 20.

Conventionally known colorants can be employed in the present invention. Examples of the colorants are, for instance, carbon black, nigrosine dye, metal complex dye, aniline blue, Calco Oil Blue (trade name of American Cyamamide Co. Ltd.), chrome yellow, ultra marine blue, quinoline yellow, methylene blue chloride, phthalocyanine blue, malachite green oxalate, lamp black, Rose Bengal (trade name of Taiwan Dyestuff & Chemical Corp.), Monastral Blue (trade name of Imperial Chemical Industries Ltd.), and the like. Known carrier materials such as magnetic substnaces can be employed in the toner composition of the present invention. Examples of the magnetic substance are, for instance, a metal powder such as iron, manganese, nickel, cobalt or chromium, an iron alloy such as ferrite or magnetite, an alloy or compound of a metal such as cobalt, nickel or manganese, and known ferromagnetic substances. It is preferable that the used amount of the colorant is from 1 to 20 parts by weight based upon 100 parts by weight of the polyester resin.

When employing the polyester resin of the present invention as a binder, the binder satisfies the above-mentioned various required properties. If necessary, by admixing an organic polyvalent metal compound with polyester resin, the offset resistance can be further improved. The organic polyvalent metal compound can be reacted with a carboxyl group of the polyester resin. Examples of the organic polyvalent metal compounds are, for instance, magnesium acetate, calcium acetate, basic aluminum acetate, calcium stearate and zinc stearate; aluminum isopropoxide, aluminum-n-butoxide; chelate compounds such as aluminum acetylacetonato, nickel acetylacetonato and iron acetylacetonato; other metal complexes such as zinc salicylate and chrome salicylate. Among them, acetylacetone metal complexes and salicylic acid metal complexes are preferable since they remarkably improve the crosslinking reactivity. It is preferable that the used amount of the organic polyvalent metal compound is 0.2 to 4% by weight based upon the polyester resin.

As mentioned above, in accordance with the present invention, an electrophotographic toner composition excellent in fixing property at a low temperature which can solve the problems that conventional techniques can not solve sufficiently, that is, all of the properties that offset resistance, blocking resistance and fixing property at a low temperature which are required in toner compositions for electrophotography are not satisfied at a time in a state of equilibration can be obtained. Further, the toner composition of the present invention can solve the problem that an electrophotographic toner composition which is suitably used in high speed machines has not yet been obtained.

The fixing property at a low temperature of the toner composition for electrophotography can be further improved by adding a bis amide of a long chain fatty acid having 20 to 32 carbon atoms in an amount of not more than 5% by weight, preferably 0.5 to 5% by weight based upon the above-mentioned polyester resin. Also, blocking resistance can be improved and it can be prevented that a photosensitive material is filmed with the toner composition or its component by improving the compatibility of a polyolefin wax mentioned later and a polyester resin. The polyolefin wax contributes that the blocking resistance is more improved. The used amount of the polyolefin wax is up to 5% by weight, preferably 0.5 to 5% by weight based upon the above-mentioned polyester resin. When the used amount of the bis amide of a long chain fatty acid is more than 5% by weight, heat deterioration of a toner composition is occurred during the storage, and when the used amount of the polyolefin wax is more than 5% by weight, the photosensitive material tends to be filmed with the toner composition.

Examples of the bis amide of a long chain fatty acid having 20 to 32 carbon atoms are, for instance, aliphatic bis amides such as ethylene bis behenic acid amide, methylene bis behenic acid amide, N,N'-dibehenyl terephthalic acid amide, ethylene bis montanic acid amide, ethylene bis lacceric acid amide, ethylene bis cerotic acid amide and ethylene bis montanic acid amide or aromatic bis amides. When amides having 11 to 18 carbon atoms such as lauric acid amide, palmitic acid amide and stearic acid amide are employed, the improvement of fixing property at a low temperature can not be expected.

As a polyolefin wax, low molecular weight polyethylene, low molecular weight polypropylene, polyethylene oxide, polytetrafluoroethylene, and the like can be employed.

The present invention is more specifically described and explained by means of the following Reference Example, Preparation Examples, Comparative Preparation Examples, Examples and Comparative Examples. However, it should be understood that the present invention is not limited to these Examples and various changes and modifications can be made in the invention without departing from the spirit and scope thereof. In the Examples, all parts and % are by weight unless otherwise noted.

REFERENCE EXAMPLE (Preparation of rosin glycidyl ester)

A glycidyl ester of disproportionated rosin was prepared as follows: A 500 ml. of flask equipped with a stirrer and a reflux condenser was charged with 100 g. of disproportionated rosin (acid value: 162, softening point: 79° C.) having a purity of 87% (the residual 13% portion being non-hydrolysate), 200 g. of epichlorohydrin and 0.1 g. of benzyltrimethylammonium chloride. The reaction was carried out at 80° C. for 4 hours. To the flask was added 16 g. of particulate sodium hydroxide by installments at the same temperature mentioned above. The temperature was elevated to 100° C. and the reaction was further continued at 100° C. for 2 hours. The deposited sodium chloride was filtered, and the unreacted epichlorohydrin was distilled away from the filtrate by a rotary evaporator. Further, a volatile material was completely removed at 120° C. and 2 mmHg to give an oily light yellow product (yield: 97.2%). The thus obtained product had an acid value of 0 and an epoxy equivalent of 425. The purity calculated on the basis of the epoxy equivalent was 84%.

PREPARATION EXAMPLE 1

A reactor was charged with 19.9 g of tetracosanedicarboxylic acid, 157.7 g. of terephthalic acid, 441.0 g. of polyoxypropylene-(2,2)-2,2-bis(4-hydroxyphenyl)propane and 0.2 g. of dibutyltin oxide. The reaction was carried out in a nitrogen stream at 240° C. for 8 hours. After it was confirmed that the acid value had attained to about 13, 28.8 g. of trimellitic acid anhydride was added thereto and the reaction was continued. The reaction was finished when it was confirmed that the softening point had attained to the prescribed point by a flow tester. (The measurement of softening point was carried out with a flow tester by measuring the temperature when the penetration of the needle of the flow tester was 4 mm. Hereinafter the measurement was carried out in the same manner mentioned above.)

The thus obtained resin had a glass transition point of 65° C. and a softening point of 148° C.

PREPARATION EXAMPLES 2 to 15 and COMPARATIVE PREPARATION EXAMPLES 1 to 3

The procedure of Preparation Example 1 was repeated except that the kinds and amount of the starting materials were changed as shown in Table 1 to give a polyester resin. The measured results of the resin constant are shown in Table 1.

TABLE 1

| Preparation Example | Starting materials Acid components | | Monocarboxylic acid (g.) | | Aromatic dicarboxylic acid (g.) | |
|---|---|---|---|---|---|---|
| | Linear aliphatic dicarboxylic acid, dimer acid and dibasic acid having 21 carbon atoms (g.) | | | | | |
| 1 | Tetracosanedicarboxylic acid | 19.9 | — | | TPA | 157.7 |
| 2 | Eicosanedicarboxylic acid | 34.2 | — | | TPA | 149.4 |
| 3 | C21 acid | 35.2 | — | | TPA | 149.4 |
| 4 | Hexadecanedicarboxylic acid | 57.2 | — | | TPA | 132.8 |
| 5 | Dimer acid | 56.0 | — | | TPA | 149.4 |

| Preparation Example | Starting materials | | Crosslinking component | | Resin constant | | | |
|---|---|---|---|---|---|---|---|---|
| | Alcohol components | | Tri- or higher valent polybasic acid or tri- or higher valent polyhydric alcohol (g.) | | Acid value | Glass transition temperature (°C.) | Softening point (°C.) | Percentage of undissolved THF (%) |
| | Rosin glycidyl ester (g.) | Etherificated diphenol (g.) | | | | | | |
| 1 | — | BPA(2,2)PO 441.0 | TMA | 28.8 | 12 | 65 | 148 | 25 |
| | | BPA(2,2)EO 300.1 | | | | | | |
| 2 | — | BPA(2,2)PO 132.3 | TMA | 28.8 | 13 | 66 | 160 | 55 |
| 3 | — | BPA(2,2)PO 441.0 | GLY | 9.2 | 12 | 68 | 162 | 63 |
| 4 | — | BPA(2,2)PO 441.0 | TMA | 28.8 | 11 | 65 | 156 | 35 |
| | | BPA(2,2)EO 330.1 | | | | | | |
| 5 | — | BPA(2,2)EO 132.3 | TMA | 28.8 | 14 | 67 | 165 | 65 |

| Preparation Example | Staring materials Acid components | | Monocarboxylic acid (g.) | | Aromatic dicarboxylic acid (g.) | |
|---|---|---|---|---|---|---|
| | Linear aliphatic dicarboxylic acid, dimer acid and dibasic acid having 21 carbon atoms (g.) | | | | | |
| 6 | Eicosanedicarboxylic acid | 34.2 | — | | TPA | 149.4 |
| 7 | Eicosanedicarboxylic acid | 34.2 | — | | TPA | 149.4 |
| 8 | Tetracosanedicarboxylic acid | 39.8 | PTBA | 35.6 | TPA | 116.2 |
| 9 | Eicosanedicarboxylic acid | 34.2 | PTBA | 71.2 | TPA | 83.0 |
| 10 | Eicosanedicarboxylic acid | 34.2 | Rondis R | 103.5 | TPA | 99.6 |
| 11 | Eicosanedicarboxylic acid | 34.2 | PTBA | 53.4 | TPA | 99.6 |
| 12 | Eicosanedicarboxylic acid | 34.2 | Rondis R | 103.5 | TPA | 99.6 |
| 13 | Dimer acid | 28.0 | PTBA | 53.4 | TPA | 107.9 |
| 14 | Dimer acid | 28.0 | Rondis R | 103.5 | TPA | 107.9 |
| 15 | Hexadecanedicarboxylic acid | 57.2 | BA | 36.6 | TPA | 83.0 |

| Starting materials | Resin constant |
|---|---|

TABLE 1-continued

| Preparation Example | Alcohol components | | | Crosslinking component | | Acid value | Glass transition temperature (°C.) | Softening point (°C.) | Percentage of undissolved THF (%) |
|---|---|---|---|---|---|---|---|---|---|
| | Rosin glycidyl ester (g.) | Etherified diphenol | (g.) | Tri- or higher valent polybasic acid or tri- or higher valent polyhydric alcohol (g.) | | | | | |
| 6 | Ref. Ex. 52.1 | BPA(2,2)PO | 396.9 | TMA | 28.8 | 10 | 68 | 165 | 65 |
| 7 | Ref. Ex. 156.2 | BPA(2,2)EO BPA(2,2)PO | 214.4 88.2 | TMA | 28.8 | 14 | 69 | 168 | 67 |
| 8 | — | BPA(2,2)PO | 414.0 | TMA | 48.0 | 12 | 62 | 150 | 40 |
| 9 | — BPA(2,2)PO 124.2 | BPA(2,2)EO | 281.8 | TMA | 48.0 | 11 | 63 | 161 | 55 |
| 10 | — | BPA(2,2)EO BPA(2,2)PO | 281.8 124.2 | TMA | 48.0 | 13 | 68 | 155 | 43 |
| 11 | Ref. Ex. 48.9 | BPA(2,2)EO BPA(2,2)PO | 241.5 124.2 | TMA | 48.0 | 9 | 66 | 154 | 30 |
| 12 | Ref. Ex. 97.8 | BPA(2,2)PO | 331.2 | TMA | 48.0 | 14 | 68 | 163 | 65 |
| 13 | Ref. Ex. 48.9 | BPA(2,2)EO BPA(2,2)PO | 241.5 124.2 | TMA | 48.0 | 15 | 65 | 165 | 70 |
| 14 | Ref. Ex. 97.8 | BPA(2,2)EO BPA(2,2)PO | 241.5 82.8 | TMA | 48.0 | 12 | 67 | 160 | 63 |
| 15 | Ref. Ex. 48.9 | BPA(2,2)PO | 372.6 | TMA | 48.0 | 18 | 65 | 160 | 45 |

| Preparation Example | Starting materials Acid components | | | | | | |
|---|---|---|---|---|---|---|---|
| | Linear aliphatic dicarboxylic acid, dimer acid and dibasic acid having 21 carbon atoms (g.) | | Monocarboxylic acid (g.) | | Aromatic dicarboxylic acid (g.) | | |
| Comparative Preparation Example 1 | — | | — | | TPA | 166.0 | |
| 2 | Sebacic acid | 20.2 | — | | TPA | 149.4 | |
| 3 | Adipic acid | 33.6 | | | TPA | 127.8 | |

| Preparation Example | Starting materials | | | | | Resin constant | | | |
|---|---|---|---|---|---|---|---|---|---|
| | Alcohol components | | | crosslinking component | | | Glass transition temperature (°C.) | Softening point (°C.) | Percentage of undissolved THF (%) |
| | Rosin glycidyl ester (g.) | Etherified diphenol | (g.) | Tri- or higher valent polybasic acid or tri- or higher valent polyhydric alcohol (g.) | | Acid value | | | |
| Comparative preparation Example 1 | — | BPA (2,2) PO | 441.0 | TMA | 28.8 | 15 | 75 | 168 | 71 |
| 2 | — | BPA (2,2) PO | 441.0 | TMA | 28.8 | 11 | 65 | 146 | 26 |
| 3 | — | BPA (2,2) EO BPA (2,2) PO | 300.1 132.3 | TMA | 28.8 | 13 | 67 | 160 | 55 |

(Note)
C21 acid: dibasic acid having 21 carbon atoms (commercial name; available from Westvaco Corp.) Tetracosanedicarboxylic acid: HOOC(CH$_2$)$_{22}$COOH, Eicosanedicarboxylic acid: HOOC(CH$_2$)$_{18}$COOH, Hexadecanedicarboxyic acid: HOOC(CH$_2$)$_{14}$COOH, PTBA: Para tert-butyl benzoic acid, BA: Benzoic acid, Rondis R: Disproportionated rosin (made by Arakawa Kagaku Kogyo Kabushiki Kaisha), TPA: Terephthalic acid, GLY: Glycerol, TMA: Trimellitic acid anhydride, BPA(2,2)PO: Polyoxypropylene (2,2)-bis(4-hydroxyphenylpropane, BPA(2,2)EO: Polyoxyethylene(2,2)-bis(4-hydroxyphenyl)propane

PREPARATION EXAMPLES 16 to 22 and COMPARATIVE PREPARATION EXAMPLES 4 and 5

The procedure of Example 1 was repeated except that each kind and amount of the starting material was changed as in Preparation Examples 1, 2, 6, 8, 11, 13 and 15 and Comparative Preparation Examples 1 and 2 and the reaction was finished when the acid value had attained the value shown in Table 2 to give a polyester resin. The measured results of resin constant are shown in Table 2.

TABLE 2

| Preparation Example | Starting materials Acid components | | | | | | |
|---|---|---|---|---|---|---|---|
| | Linear aliphatic dicarboxylic acid, dimer acid and dibasic acid having 21 carbon atoms (g.) | | Monocarboxylic acid (g.) | | Aromatic dicarboxylic acid (g.) | | |
| 16 | Tetracosanedicarboxylic acid | 19.9 | — | | TPA | 157.7 | |
| 17 | Eicosanedicarboxylic acid | 34.2 | — | | TPA | 149.4 | |
| 18 | Eicosanedicarboxylic acid | 34.2 | — | | TPA | 149.4 | |
| 19 | Tetracosanedicarboxylic acid | 39.8 | PTBA | 35.6 | TPA | 116.2 | |
| 20 | Eicosanedicarboxylic acid | 34.2 | PTBA | 53.4 | TPA | 99.6 | |
| 21 | Dimer acid | 28.0 | PTBA | 53.4 | TPA | 107.9 | |
| 22 | Hexadecanedicarboxylic acid | 57.2 | BA | 36.6 | TPA | 83.0 | |
| Comparative Preparation Example 4 | — | | — | | TPA | 166.0 | |
| 5 | Sebacic acid | 20.2 | — | | TPA | 149.4 | |

TABLE 2-continued

| | Starting materials | | | | | | Resin constant | | | |
|---|---|---|---|---|---|---|---|---|---|---|
| | Alcohol components | | | crosslinking component | | | | | | |
| Preparation Example | Rosin glycidyl ester (g.) | Etherificated diphenol (g.) | | Tri- or higher valent polybasic acid or tri- or higher valent polyhydric alcohol (g.) | | Acid value | Glass transition temperature (°C.) | Softening point (°C.) | Percentage of undissolved THF (%) |
| 16 | — | BPA (2,2) PO | 441.0 | TMA | 28.8 | 14 | 63 | 125 | 0 |
| 17 | — | BPA (2,2) EO | 300.1 | TMA | 28.8 | 15 | 64 | 145 | 10 |
| | | BPA (2,2) PO | 132.3 | | | | | | |
| 18 | Ref. Ex. 52.1 | BPA (2,2) PO | 396.9 | TMA | 28.8 | 12 | 66 | 135 | 0 |
| 19 | — | BPA (2,2) PO | 414.0 | TMA | 48.0 | 13 | 62 | 130 | 0 |
| 20 | Ref. Ex. 48.9 | BPA (2,2) EO | 241.5 | TMA | 48.0 | 11 | 64 | 137 | 0 |
| | | BPA (2,2) PO | 124.2 | | | | | | |
| 21 | Ref. Ex. 48.9 | BPA (2,2) EO | 241.5 | TMA | 48.0 | 17 | 64 | 135 | 0 |
| | | BPA (2,2) PO | 124.2 | | | | | | |
| 22 | Ref. Ex. 48.9 | BPA (2,2) PO | 372.6 | TMA | 48.0 | 20 | 65 | 150 | 30 |
| Comperative Preparation | | | | | | | | | |
| Example 4 | | BPA (2,2) PO | 441.0 | TMA | 28.8 | 17 | 73 | 135 | 0 |
| Example 5 | | BPA (2,2) PO | 441.0 | TMA | 28.8 | 13 | 64 | 130 | 0 |

EXAMPLE 1

4 parts of carbon black MA# 100 (made by MITSUBISHI CHEMICAL INDUSTRIES LTD.) and 2 parts of Viscol 550P (polypropylene wax made by Sanyo Chemical Industries, Ltd.) were added to 100 parts of the polyester resin obtained in Preparation Example 1, and they were thoroughly mixed and kneaded by an extruder. After cooling, the extrudate was roughly pulverized to have a particle size of about 1 cm. and was finely divided by a jet pulverizer, and then was followed by classification using a wind power-classifier. In the above manner, there was obtained a toner having an average particle size of 13 to 15 μm.

A developer was prepared by adding 95 parts of iron powder carrier to 5 parts of the toner, and a latent electrostatic image was developed therewith by using an electrophotographic copying machine. The developed latent electrostatic image was transferred on a sheet of ordinal plain paper and fixed a fixing roller having polytetrafluoroethylene coated surface. At that time, the temperature of the fixing roller was variously changed.

The fixing percentage (%) was measured after the surface was rubbed with an eraser (reciprocation time was 10 times). The offset resistance was observed by naked eyes and was estimated according to the following criteria.

O: No offset was observed.

X: A large amount of offset were observed.

The blocking resistance was estimated by employing 20 g. of the toner, allowing to stand for 24 hours in a thermostat of which temperature was 50° C., cooling at room temperature, and observing the degree of the massiveness.

EXAMPLES 2 to 15 AND COMPARATIVE EXAMPLES 1 to 3

The procedure of Example 1 was repeated to produce toners from polyester resins prepared in Preparation Examples 2 to 15 and Comparative Preparation Examples 1 to 3, and the properties of the toners were estimated. The results are shown in Table 3.

TABLE 3

| | Polyester resin | Fixing percentage (%) | | | Offset resistance (at 240° C.) | Brocking resistance |
|---|---|---|---|---|---|---|
| | | 140° C. | 160° C. | 180° C. | | |
| Example | | | | | | |
| 1 | Pre. Ex. No. 1 | 82 | 88 | 96 | O | O |
| 2 | Pre. Ex. No. 2 | 84 | 90 | 100 | O | O |
| 3 | Pre. Ex. No. 3 | 83 | 88 | 95 | O | O |
| 4 | Pre. Ex. No. 4 | 82 | 87 | 97 | O | O |
| 5 | Pre. Ex. No. 5 | 83 | 88 | 96 | O | O |
| 6 | Pre. Ex. No. 6 | 88 | 93 | 98 | O | O |
| 7 | Pre. Ex. No. 7 | 87 | 94 | 98 | O | O |
| 8 | Pre. Ex. No. 8 | 90 | 96 | 100 | O | O |
| 9 | Pre. Ex. No. 9 | 86 | 95 | 100 | O | O |
| 10 | Pre. Ex. No. 10 | 90 | 93 | 98 | O | O |
| 11 | Pre. Ex. No. 11 | 95 | 100 | 100 | O | O |
| 12 | Pre. Ex. No. 12 | 94 | 100 | 100 | O | O |
| 13 | Pre. Ex. No. 13 | 95 | 100 | 100 | O | O |
| 14 | Pre. Ex. No. 14 | 97 | 100 | 100 | O | O |
| 15 | Pre. Ex. No. 15 | 95 | 100 | 100 | O | O |
| Comparative Example | | | | | | |
| 1 | Com. Pre. Ex. No. 1 | 30 | 42 | 55 | O | O |
| 2 | Com. Pre. Ex. No. 2 | 67 | 70 | 81 | X | O |
| 3 | Com. Pre. Ex. No. 3 | 65 | 72 | 82 | X | O |

EXAMPLE 16

To 100 parts of polyester resin obtained in Preparation Example 16 was added 4 parts of carbon black MA# 100, 2 parts of Viscol 550P and 1 part of aluminum acetylacetonato, and they were throughly mixed and kneaded by an extruder. The obtained extrudent was prepared to give a toner in the same manner as in Example 1 and the properties of the toner were observed. The results are shown in Table 4.

EXAMPLES 17 to 22 AND COMPARATIVE EXAMPLES 4 AND 5

The procedure of Example 16 was repeated to give toners except that polyester resins of Preparation Examples 17 to 22 and Comparative Preparation Examples 4 and 5 are employed and the properties of toners were observed. The results are shown in Table 4.

TABLE 4

| | Polyester resin | Fixing percentage (%) | | | Offset resistance (at 240° C.) | Brocking resistance |
|---|---|---|---|---|---|---|
| | | 140° C. | 160° C. | 180° C. | | |
| Example | | | | | | |
| 16 | Pre. Ex. No. 16 | 83 | 88 | 95 | O | O |
| 17 | Pre. Ex. No. 17 | 85 | 90 | 97 | O | O |
| 18 | Pre. Ex. No. 18 | 86 | 92 | 98 | O | O |
| 19 | Pre. Ex. No. 19 | 90 | 95 | 100 | O | O |
| 20 | Pre. Ex. No. 20 | 93 | 97 | 100 | O | O |
| 21 | Pre. Ex. No. 21 | 97 | 100 | 100 | O | O |
| 22 | Pre. Ex. No. 22 | 92 | 98 | 100 | O | O |
| Comparative Example | | | | | | |
| 4 | Com. Pre. Ex. No. 4 | 25 | 35 | 48 | O | O |
| 5 | Com. Pre. Ex. No. 5 | 65 | 72 | 80 | X | O |

EXAMPLE 23

The procedure of Example 1 was repeated to give a toner except that 2 parts of ethylene bis montanic acid amide was added to the toner composition and the properties of a toner were observed. The results are shown in Table 5.

EXAMPLE 24

The procedure of Example 16 was repeated to give a toner except that 2 parts of ethylene bis behenic acid amide was added to the toner composition and the properties of a toner were observed. The results are shown in Table 5.

TABLE 5

| No. | Fixing percentage | | | Offset resistance (at 240° C.) | Blocking resistance |
|---|---|---|---|---|---|
| | 140° C. | 160° C. | 180° C. | | |
| 23 | 90 | 95 | 97 | O | O |
| 24 | 91 | 94 | 98 | O | O |

In addtion to the ingredients used in the examples, other ingredients can be used in the Examples as set forth in the specification to obtain substantially the same results.

What is claimed is:

1. A toner composition for electrophotography excellent in fixing property at a low temperature for use with heat roller systems, comprising a resin binder and a colorant which is dispersed in the resin binder, said resin binder being a nonlinear polyester resin prepared by the reaction of:
    (a) an acid component comprising at least one long chain dicarboxylic acid selected from the group consisting of a linear aliphatic dicarboxylic acid having 16 to 34 carbon atoms, a dimer said and a dibasic acid having 21 carbon atoms, and an aromatic dicarboxylic acid,
    (b) an alcohol component comprising an etherificated diphenol and a glcyidyl ester of rosin and
    (c) a crosslinking component comprising a polycarboxylic acid having a valency of not less than 3 and/or a polyhydric alcohol having a valency of not less than 3, wherein the contents of the long chain dicarboxylic acid and the aromatic dicarboxylic acid are 2 to 25% by mole and 75 to 98% by mole, respectively, based upon the total amount of the (a) acid component, the contents of said etherificated diphenol and said glycidyl ester of rosin are 70 to 95% by mole and 5 to 30% by mole, respectively, based upon the total amount of said polyhydric alcohol, the content of the (c) crosslinking component is 0.5 to 8% by weight of the polyester resin, and an organic polyvalent metal compound is present in an amount of 0 to 4% by weight based upon said polyester resin.

2. A toner composition for electrophotography excellent in fixing property at a low temperature for use with heat roller systems, comprising a resin binder and a colorant which is dispersed in the resin binder, the resin binder being a nonlinear polyester resin prepared by the reaction of:
    (a) an acid component comprising at least one long chain dicarboxylic acid selected from the group consisting of a linear aliphatic dicarboxylic acid having 16 to 34 carbon atoms, a dimer acid and a dibasic acid having 21 carbon atoms, an aromatic dicarboxylic acid and a monocarboxylic acid,
    (b) an alcohol component comprising an etherificated diphenol and
    (c) a crosslinking component comprising a polycarboxylic acid having a valency of not less than 3 and/or a polyhydric alcohol having a valency of not less than 3, wherein the contents of the long chain dicarboxylic acid, the aromatic dicarboxylic aid and the monocarboxylic acid are 2 to 25% by mole, 10 to 93% by mole and 5 to 65% by mole, respectively, based upon the total amount of the (a) acid component, the content of the (c) crosslinking component is 0.5 to 8% by weight of the polyester resin, and an organic polyvalent metal compound is present in an amount of 0 to 4% by weight based upon the polyester resin.

3. A toner composition for electrophotography excellent in fixing property at a low temperature for use with heat roller systems, comprising a resin binder and a colorant which is dispersed in the resin binder, the resin binder being a nonlinear polyester resin prepared by the reaction of:
(a) an acid component comprising at least one long chain dicarboxylic acid selected from the group consisting of a linear aliphatic dicarboxylic acid having 16 to 34 carbon atoms, a dimer acid and a dibasic acid having 21 carbon atoms, an aromatic dicarboxylic acid and a monocarboxylic acid,
(b) an alcohol component comprising an etherificated diphenol and a glycidyl ester of rosin and
(c) a crosslinking component comprising a polycarboxylic acid having a valency of not less than 3 and/or a polyhydric alcohol having a valency of not less than 3, wherein the contents of the long chain dicarboxylic acid, the aromatic dicarboxylic acid and the monocarboxylic acid are 2 to 25% by mole, 10 to 93% by mole and 5 to 65% by mole, respectively, based upon the total amount of the (a) acid component, the contents of the etherificated diphenol and the glycidyl ester of rosin are 70 to 95% by mole and 5 to 30% by mole, respectively, based upon the total amount of the polyhydric alcohol, the content of the (c) crosslinking component is 0.5 to 8% by weight of said polyester resin, and an organic polyvalent metal component is present in an amount of 0 to 4% by weight based upon said polyester resin.

* * * * *